United States Patent [19]

Collins et al.

[11] Patent Number: 5,461,564
[45] Date of Patent: Oct. 24, 1995

[54] APPARATUS AND METHOD FOR CALIBRATING VEHICLE RIDE HEIGHT

[75] Inventors: Ronald J. Collins, Dearborn; Christopher A. Tallon, Ypsilanti; Kelly H. Jones, Wixom; Joseph M. Raad, Southgate; Steven J. Reimers, Allen Park; Martin Bieber, Redford, all of Mich.

[73] Assignee: Ford Motor Company, Dearborn, Mich.

[21] Appl. No.: 288,095

[22] Filed: Aug. 9, 1994

[51] Int. Cl.⁶ .......................... G01D 18/00; B60G 17/015
[52] U.S. Cl. ................... 364/424.05; 364/571.05; 73/1 J; 280/707; 280/840
[58] Field of Search .................. 364/424.05, 551.01, 364/561, 562, 569, 571.04, 571.05; 73/117, 118.1, 1 J, 11.04, 65.01; 180/41; 280/840, 6.1, 6.11, 43, 707; 367/95, 99, 118, 124

[56] References Cited

U.S. PATENT DOCUMENTS

| | | | |
|---|---|---|---|
| 4,185,845 | 1/1980 | Misch et al. | 280/707 |
| 4,517,832 | 5/1985 | Holland et al. | 73/118.1 |
| 4,630,226 | 12/1986 | Tanaka | 364/561 |
| 4,693,485 | 9/1987 | Kamei et al. | 180/41 |
| 4,787,644 | 11/1988 | Yokote | 280/6 R |
| 4,822,063 | 4/1989 | Yopp et al. | 280/840 |
| 4,877,263 | 10/1989 | Konishi et al. | 280/707 |
| 4,962,664 | 10/1990 | Hirano et al. | 73/118.1 |
| 5,068,792 | 11/1991 | Lehr et al. | 364/424.05 |
| 5,267,466 | 12/1993 | Morris | 364/424.05 |

Primary Examiner—Kevin J. Teska
Assistant Examiner—Tan Q. Nguyen
Attorney, Agent, or Firm—David B. Kelley; Roger L. May

[57] ABSTRACT

An apparatus calibrates a suspension control module of a vehicle to within a preselected tolerance of a predetermined ride height with reference to the vehicle coordinate system, the vehicle having at least one adjustable suspension unit interposed between the sprung and unsprung vehicle mass. The calibration is adjusted for rigid body cross-talk and for suspension system overshoot and undershoot. The apparatus includes a first device for measuring a first distance corresponding to an actual ride height of a vehicle and for generating a first signal representative thereof and a second device for measuring a second distance between the vehicle sprung and unsprung mass and for generating a second signal thereof. The apparatus also includes a processor operatively associated with the first and second measuring devices for comparing the first and second signals and calculating a deviation between the signals, the processor being operative to generate a third signal corresponding to the deviation and store this deviation in the suspension control module. A centering mechanism on the apparatus centers the vehicle over the first measuring device prior to calibration of the suspension control module.

18 Claims, 5 Drawing Sheets

APPARATUS AND METHOD FOR CALIBRATING VEHICLE RIDE HEIGHT

FIELD OF THE INVENTION

The present invention relates generally to automotive suspension control modules, and, more particularly, to an improved apparatus and method for calibrating an automotive suspension control module to within a preselected tolerance of a predetermined ride height.

BACKGROUND OF THE INVENTION

Ride height on vehicles equipped with an electronically controlled suspension is monitored by a ride height sensor connected between a suspension member and the body of the vehicle. On vehicles having load leveling, air, hydropneumatic or hydraulic suspension systems, it is necessary to know the ride height of the vehicle in order to determine whether correction of the ride height is required. For example, in the event that the ride height is less than prescribed limits, as determined by the height sensor, an adjustable suspension unit may be given the command to increase the ride height. Conversely, in the event that the ride height exceeds the prescribed limits, the adjustable suspension unit may be given the command to lower or decrease the ride height.

Current manufacturing technology calls for attachment of the height sensor to the vehicle to be "trend set" or placed and adjusted on the vehicle during the assembly process using data provided from a small sample of previously built vehicles. Alternatively, a means of measuring the distance between the sensor attachment points at a known suspension position relative to the body can be used to attempt to accurately position the sensor. Both of these processes attempt to overcome the natural manufacturing build variation of the vehicle. Unfortunately, both of these processes are inherently imprecise, inaccurate, and labor intensive, leading to vehicles that lean, display improper attitude, and suffer from alignment drift and pull.

An apparatus and method for calibrating a vehicle suspension control module is disclosed in U.S. Pat. No. 5,267,466, assigned to the assignee of the present invention, and which is hereby incorporated by reference. That apparatus comprises first means, such as a laser, for measuring an actual ride height of a vehicle, second means, such as a linear height sensor, for measuring the distance between the sprung and unsprung vehicle mass, and a processor for comparing the first and second signals and for calculating a deviation therebetween which is stored in the suspension control module. The processor also adjusts the second signal by the deviation to provide correlation between the sprung and unsprung vehicle mass, and the actual ride height of the vehicle. That calibration apparatus and method, however, measures ride height with respect to ground and does not take into account several sources of error, particularly tire pressure variation, rigid body cross-talk, and suspension control system over/undershoot. Such errors can lead to inaccurate ride height determination. In addition, there is no provision in the prior apparatus for centering the vehicle relative to the first measurement means, the laser, resulting in inexact measurement.

An object of the present invention is to provide an apparatus for more accurately calibrating a suspension control module which measures ride height with respect to a vehicle coordinate system.

It is also an object of the present invention to provide an apparatus for calibrating a suspension control module which may be utilized in a factory setting in a cost and time efficient manner.

Yet another object of the present invention is to provide an apparatus for calibrating a suspension control module which corrects for vehicle rigid body cross-talk and for air suspension control system overshoot or undershoot.

It is an advantage of the present invention that vehicle ride height is measured with reference to a vehicle coordinate system and not to the surface upon which the vehicle rests.

Another advantage is that the apparatus of the present invention is capable of calibrating the suspension control module accurately regardless of tire pressure.

It is a feature of the present invention that the vehicle is centered with respect to the ride height measurement instruments prior to calibrating the suspension control module.

Another feature of the present invention is the measurement of ride height as a function of control arm angle.

It is another feature of the present invention that the apparatus for calibrating a suspension control module measures ride height with two lasers at each vehicle corner so that ride height can be accurately measured.

These and other objects, advantages, and features of the present invention will become apparent from the summary, drawings, detailed description and claims which follow.

SUMMARY OF THE INVENTION

The above described objects, advantages, and features of the present invention are achieved by providing an apparatus comprising first means for measuring a first distance corresponding to an actual ride height of the vehicle and for generating a first signal representative thereof, the first distance referenced to a coordinate system within the vehicle. The first distance in the vehicle coordinate system can be, for example, a vertical distance between two points on a control arm connecting the chassis to a wheel carrier of the vehicle. Measurement can be taken by a pair of laser measuring tools operative to generate a pair of laser signals and receive reflections of the signals from two separate points on the control arm so as to calculate a distance therebetween. A second distance between the sprung and unsprung mass of the vehicle is measured by second means for measuring and for generating a second signal representative of the second distance. Both the first and second measuring means are operatively associated with processor means which compares the first and second signals and calculates a deviation therebetween. The processor means generates a third signal corresponding to the deviation and stores it in the vehicle control module. The processor means has stored therein a predetermined value to adjust the deviation to compensate for system overshoot and undershoot, and is operative to adjust the second signal by the deviation to provide correlation between the second signal and the actual ride height. The processor means also adjusts the first distance to compensate for measuring error due to vehicle rigid body cross-talk prior to calculating the deviation.

Preferably, the vehicle is positioned so that the control arm is in vertical alignment with the laser by a pair of parallel rows of fixed rollers spaced apart so as to receive the tires of the vehicle therebetween. Each of the rows of rollers has a pair of pneumatically operable rollers adjacent the tires of the vehicle for properly positioning the vehicle with respect to the lasers by pushing on the tires.

The apparatus and method of the present invention accurately measures, calibrates, and logs vehicle ride height on vehicles equipped with electronically controlled air suspension or some other means of electronically controlled adjustable ride height. The apparatus calibrates a suspension control module of a vehicle to within a preselected tolerance of a predetermined ride height, with the vehicle having at least one adjustable suspension unit interposed between a sprung and unsprung vehicle mass. The invention can also be used to accurately measure and log ride height on vehicles equipped with passive suspension support members such as coil or leaf springs. Accurate measurement is achieved by using laser imaging in a computerized, closed-loop system without human intervention. Ride height setting is then accomplished by electronically calibrating an on-board suspension control computer to the nominal ride height ±2 mm.

DETAILED DESCRIPTION OF THE PREFERRED EMBODIMENTS

Figure 1:
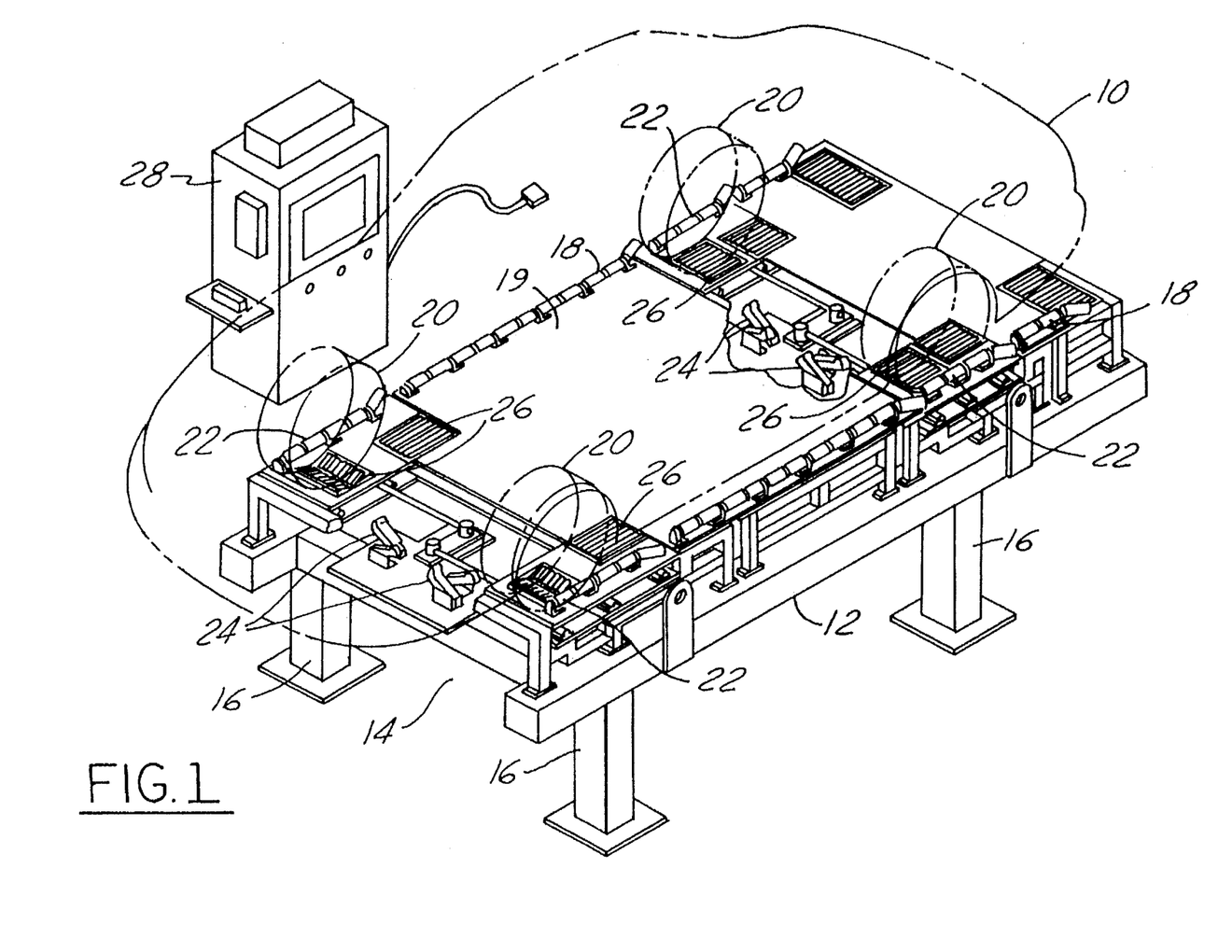
FIG. 1 is a perspective view of an apparatus according to the present invention showing the phantom outline of a motor vehicle situated thereon.
Figure 3:
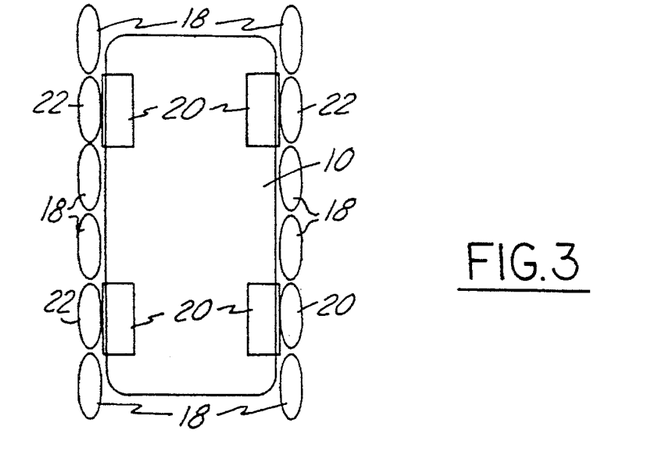
FIG. 3 is a top schematic view of an apparatus according to the present invention showing rollers for centering a vehicle therebetween.

Referring now to the drawings, FIG. 1 shows a vehicle 10 positioned on an apparatus 12 according to the present invention. Apparatus 12 rests above a garage pit area, generally indicated as 14, subjacent the floor of a garage or manufacturing facility and supported therein by posts 16. An operator is stationed in the pit 14 to make various adjustments after manufacture or for servicing vehicle 10. Apparatus 12 has a pair of parallel rows of fixed rollers 18 located above an outer edge of plate 19, for receiving the tires 20 of vehicle 10 therebetween, such as those known in the art for guiding tires of a vehicle along a predetermined path. Each row of fixed rollers 18 has a pair of movable rollers 22 adjustable along an axis perpendicular to the fixed rollers 18 in the direction of tires 20, as is best seen in FIG. 3. Movable rollers 22 position vehicle 10 on apparatus 12 in vertical alignment above the vehicle height measurement devices 24, which, as will be further described below, measure an actual ride height distance on vehicle 10. Preferably, movable rollers 22 are pneumatically operated to press inward on tires 20 so as to center vehicle 10 with respect to measurement devices 24 before calibrating the vehicle ride height. A set of sliding rollers 26 situated in the plane of plate 19 inward of fixed rollers 18 allow vehicle 10 to slide sideways as movable rollers 22 press on tires 20 (FIG. 1). Processor 28 is operatively connected to measurement devices 24, movable rollers 22, as well as the suspension control system of vehicle 10.

Figure 2:
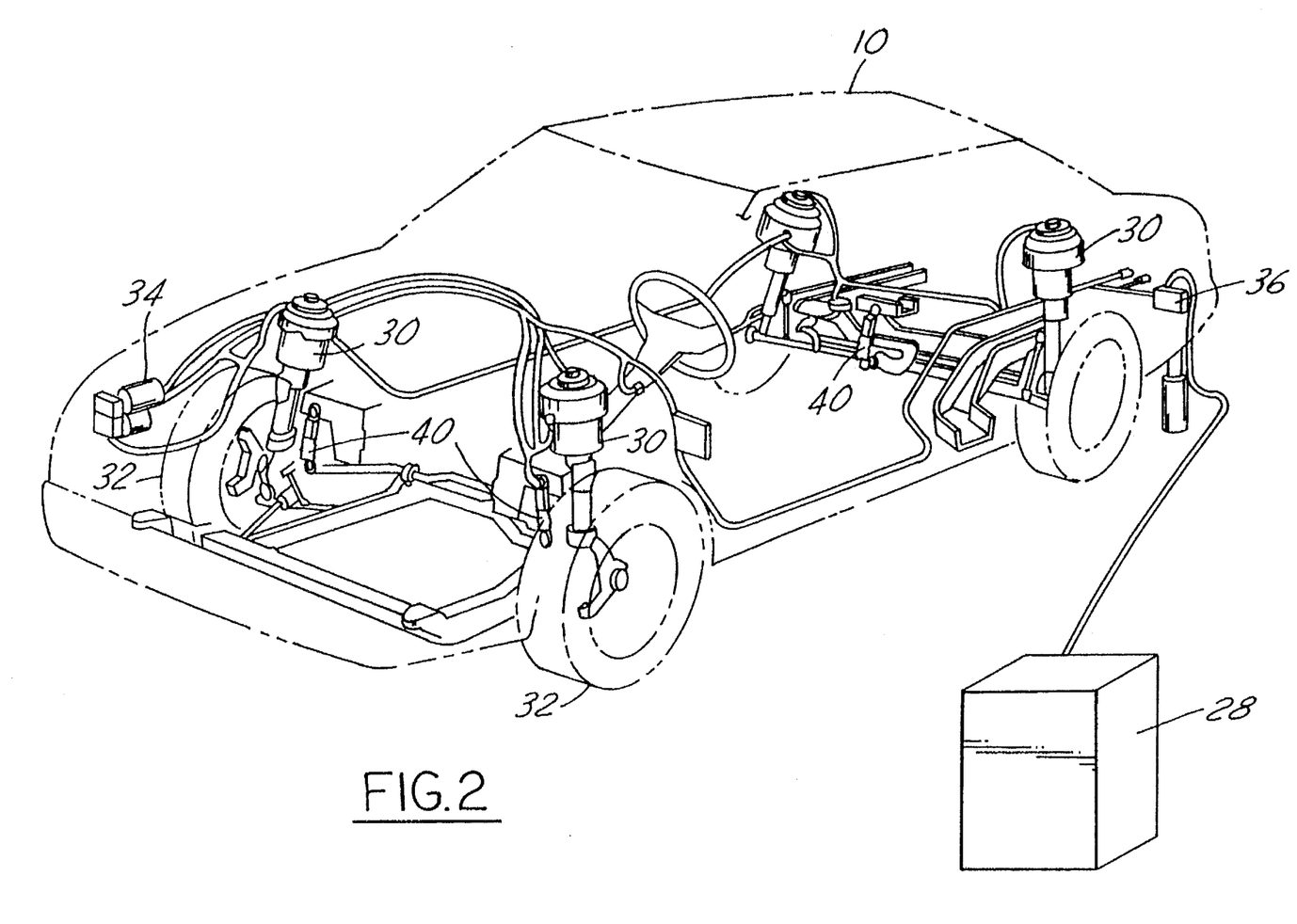
FIG. 2 is a perspective view of a motor vehicle showing the components of a vehicle suspension system as connected to an apparatus according to the present invention.

As seen in FIG. 2, the suspension control system of vehicle 10 is equipped in conventional fashion with adjustable air spring suspension units 30 which serve to control the vertical motion of the wheel and tire assemblies 32. The air springs are supplied with compressed air by compressor 34 which is electrically powered by the vehicle battery. Each of the adjustable suspension units 30 is operatively connected with and controlled by suspension control module 36. The control module includes a microprocessor and may be arranged according to a number of different architectures. Those skilled in the art will appreciate in view of this disclosure that each such architecture could generally include an input-output control circuit (I/O) for exchanging data with external devices in a random access memory (RAM) and for temporarily holding data while the data are being processed. Control programs including unit commands will be sequentially read from a read-only memory (ROM). Unit commands will be executed by a central processing unit (CPU).

Those skilled in the art will further appreciate in view of this disclosure that the system shown in FIGS. 1 and 2 represents merely one preferred embodiment of the present invention, it being understood that this invention is suitable for use with other adjustable suspension units such as air-hydraulic or hydraulic load-bearing units or combinations of adjustable load bearing and adjustable damping units such as those known in the art. A system according to this invention could be employed in conjunction with the control of damping, or spring rate, or both functions. This system could also be employed in conjunction with adjustable suspension units having variable ride height or spring load control characteristics.

Figure 4A:
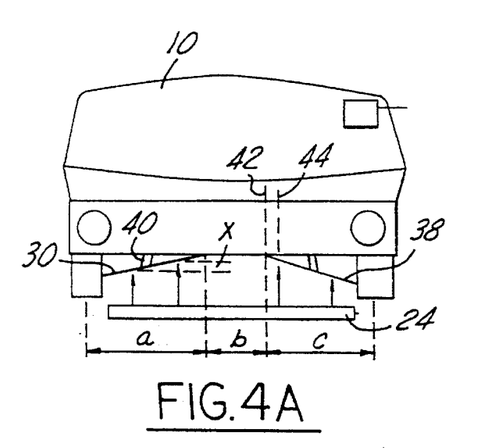
FIG. 4A is a front schematic view of a vehicle over an apparatus according to the present invention showing the vehicle at nominal ride height.

Measurement devices 24 includes means for measuring the actual vehicle ride height, which hereinafter will be the design definition of ride height. The design definition of ride height is one measured with reference to the vehicle coordinate system, that is, for example, a vertical height difference X between two separate locations on a suspension control arm 38 (FIG. 4A). Such information is necessary in order to calibrate the vehicle height sensor 40 output signals. Measurement devices 24 may also include, for example, a pair of laser transducers 24 (FIG. 1) which generate a pair of signals reflected off control arm 38 and back to the transducers to determine mathematically the distance X. Measurement devices 24 can also include a pair of sonic transducers, such as shown in FIG. 6, or pair of linear variable differential transformers (not shown) electrically connected with measurement devices 24 and which physically contact a control arm 38, or some other part of the vehicle which can be mathematically related to actual vehicle ride height.

Figure 4B:
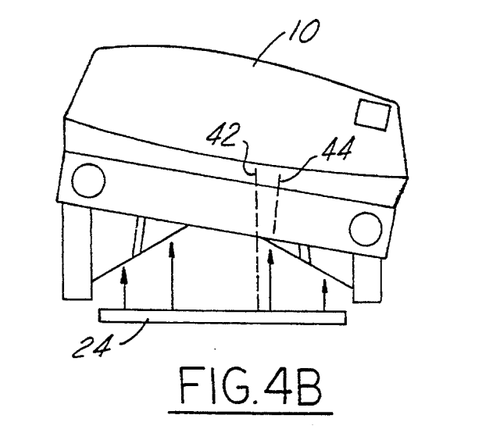
FIG. 4B is a front schematic view similar to FIG. 4A but showing the vehicle leaning.

Measurement of the actual ride height of vehicle 10 with a lasers or any other device fixed outside the vehicle coordinate system will be inherently inaccurate unless rigid body cross talk is taken into account. Rigid body cross-talk results from ride height variation on one side of vehicle 10 impacting the measurement of the ride height on the other side of the vehicle, even though the suspensions are independent of each other. An illustration of this effect is shown in FIGS. 4A and 4B. In FIG. 4A, both the left hand and right hand ride heights are at a nominal level, that is, the X values are equal. With such a situation, an axis 42 vertical with respect to laser measurement devices 24 is parallel to an axis 44 that is vertical in the vehicle coordinate system, thus resulting in accurate ride height measurement and calibration.

In FIG. 4B, however, vehicle 10 is leaning, for example, because the left hand side is higher than normal but the right hand side is at the nominal level. Because the two independent sides are connected together with the rigid vehicle 10, the right hand side will be assessed as higher than nominal by measurement devices 24 even though it is nominal in the vehicle coordinate system. This is because the left hand side of vehicle 10 is tipping the right hand side. To overcome this problem, an adjustment to the measured ride height at each vehicle 10 suspension unit is made. With reference to FIG. 4A, the adjustment comprises multiplying the ratio of a/(a+b+c) by the left hand side measured deviation from nominal, X, which is then added to the right hand side measured deviation from nominal, X, to produce a right hand side measured reading corrected for rigid body cross talk. An opposite calculation must be performed on the left hand side measured reading to correct for the right hand side deviation from nominal, X. As the ride height is adjusted toward nominal, these correction factors converge to zero.

Figure 5:
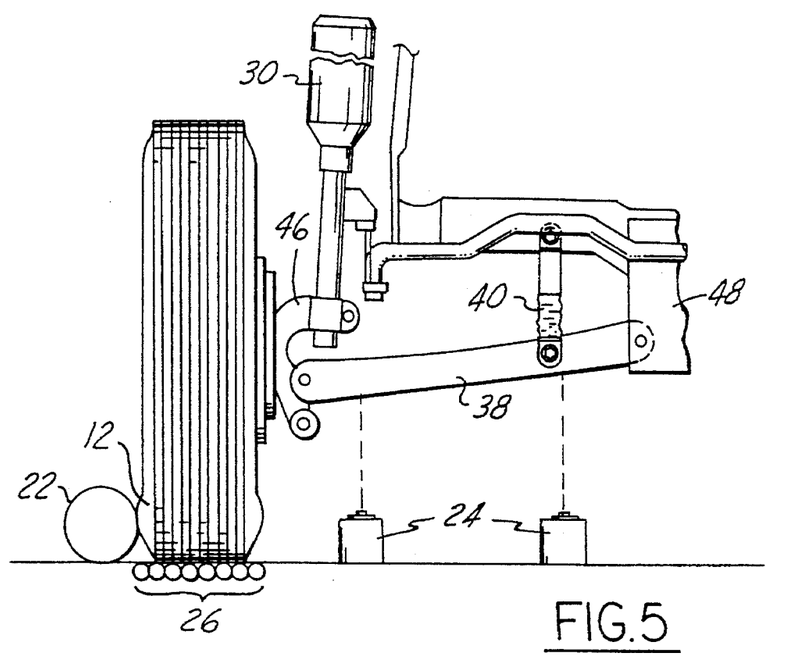
FIGS. 5 and 6 are partial perspective views of vehicles structured in accordance with the principles of the present invention.
Figure 6:
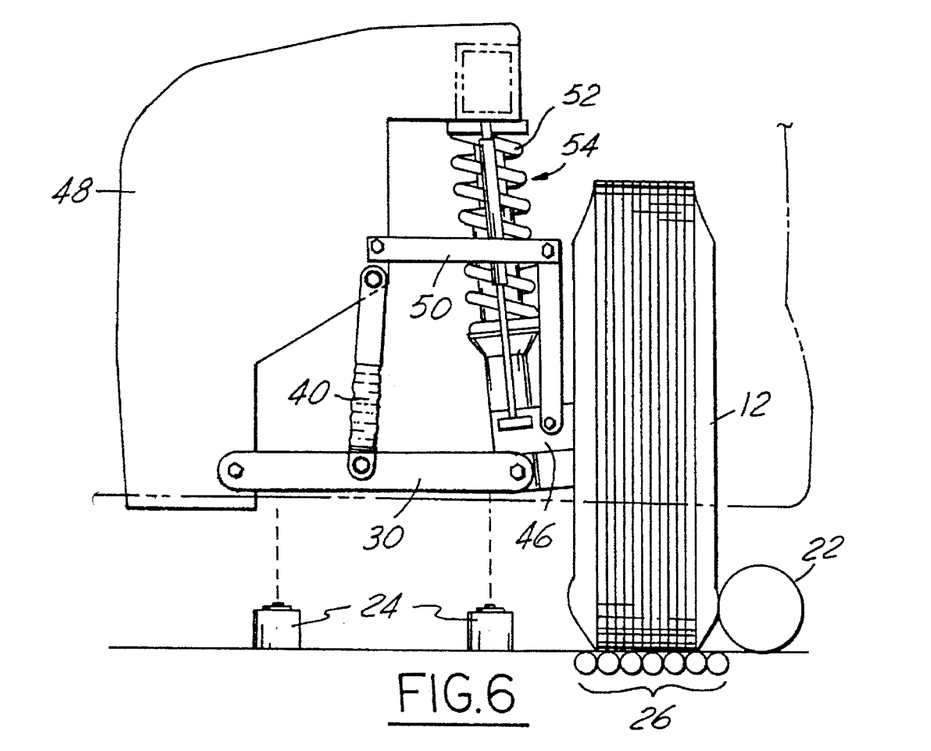

Referring now to FIGS. 5 and 6, two types of suspension systems suitable for use with the present invention are illustrated. As shown in each of these figures, the roadwheel and tire assembly 20 is rotatably supported upon wheel carrier 46, and in each case, a lower control arm 38 is pivotally connected to the wheel carrier 46 at its outboard end and to the body or chassis 48 of vehicle 10 at its inboard end. In FIG. 5, an adjustable suspension unit 30 is employed for producing damping within the suspension system and is also capable of controlling the height of the vehicle. The embodiment of FIG. 5 includes a height sensor 40 which may comprise a linear variable differential transformer (hereinafter "LVDT"), a Hall Effect device or one of a variety of other devices suitable for use according to the present invention. For example, sensor 40 may be a rotary height sensor configured using Hall Effect switches. This sensor utilizes a link and crank arm for converting the up and down motion of suspension control arm 38 into a rotary motion which may be input into the sensor, as described in U.S. Pat. No. 4,822,063, which is assigned to the assignee of the present invention and which is hereby incorporated by reference. Other types of position sensors, comprising either variable resistance, variable reluctance, variable capacitance, or Hall Effect sensors or other types of sensor known to those skilled in the art and suggested by this disclosure may be utilized as well. Regardless of the type of suspension position sensor chosen, the sensor generates a signal representing the vertical position of the wheel and tire assembly 12 as the wheel and tire moves through jounce and rebound directions. Also, the height sensor 40 may be of an analog type, generating an exact signal corresponding to each position of the roadwheel and tire assembly 12 with respect to the body or chassis of the vehicle as opposed to known digital sensors which generate a logic "1" or "0" as the roadwheel and tire assembly 12 passes through specific jounce or rebound defined areas.

FIG. 6 illustrates an alternative suspension which may be controlled by an apparatus according to the present invention. As above, the roadwheel and tire assembly 20 is rotatably supported upon wheel carrier 46, and a lower control arm 38 is pivotally connected to the wheel carrier 46 at its outboard end and to the body or chassis 48 of vehicle 10 at its inboard end. An upper control arm 50 and coil spring 52 complete the suspension geometry. Upper control arm 50 is pivotally attached at its outboard end to the wheel carrier 46 and at its inboard end to chassis 48. The suspension unit shown in FIG. 6 further includes an adjustable suspension unit 54 which may have adjustable damping or adjustable load carrying capabilities or both.

As discussed above with reference to FIGS. 1 and 2, the apparatus of the present has processor 28 for receiving information from the ride height measuring devices 24 and vehicle height sensors 40 via the suspension control module 36. As will be explained in greater detail below, control module 36 compares the height sensor 40 output signals and the actual ride height signal generated by measurement devices 24 and calculates a deviation between the signal values. Control module 36 then adjusts the height sensor output signal by this deviation so that the adjusted height sensor output signal corresponds to the actual vehicle ride height. After an iterative check to determine that the height sensor 40 output signal corresponds to the actual ride height, control module 36 stores this deviation into the memory of suspension control module 36 to correlate the height sensor output signal to the actual vehicle ride height. In this respect, proper functioning of the different height control or ride control strategies for the vehicle can be employed because there is proper correlation between the height sensor signal and the actual vehicle ride height.

Control module 36 is calibrated while the position sensor is on the vehicle instead of at the point of manufacture because vehicle attachments are the greatest source of variability of the sensor output signal. For example, if two sensors are installed successively in the same vehicle and the suspension adjusted until the sensor output is 2.5 volts, the suspension position may vary by 0.1 inches. If, however, the same sensors installed on two different vehicles and the suspension adjusted until the sensor output is 2.5 volts, the suspension positions will vary by a much greater amount, perhaps the 0.5 inches. Those skilled in the art will realize that this disclosure is not to be limited to calibrating the module while the sensor is solely on the vehicle, it being understood that control module 36 of the present invention may be calibrated also when the sensor is independent of the vehicle.

Figures 7, 8:
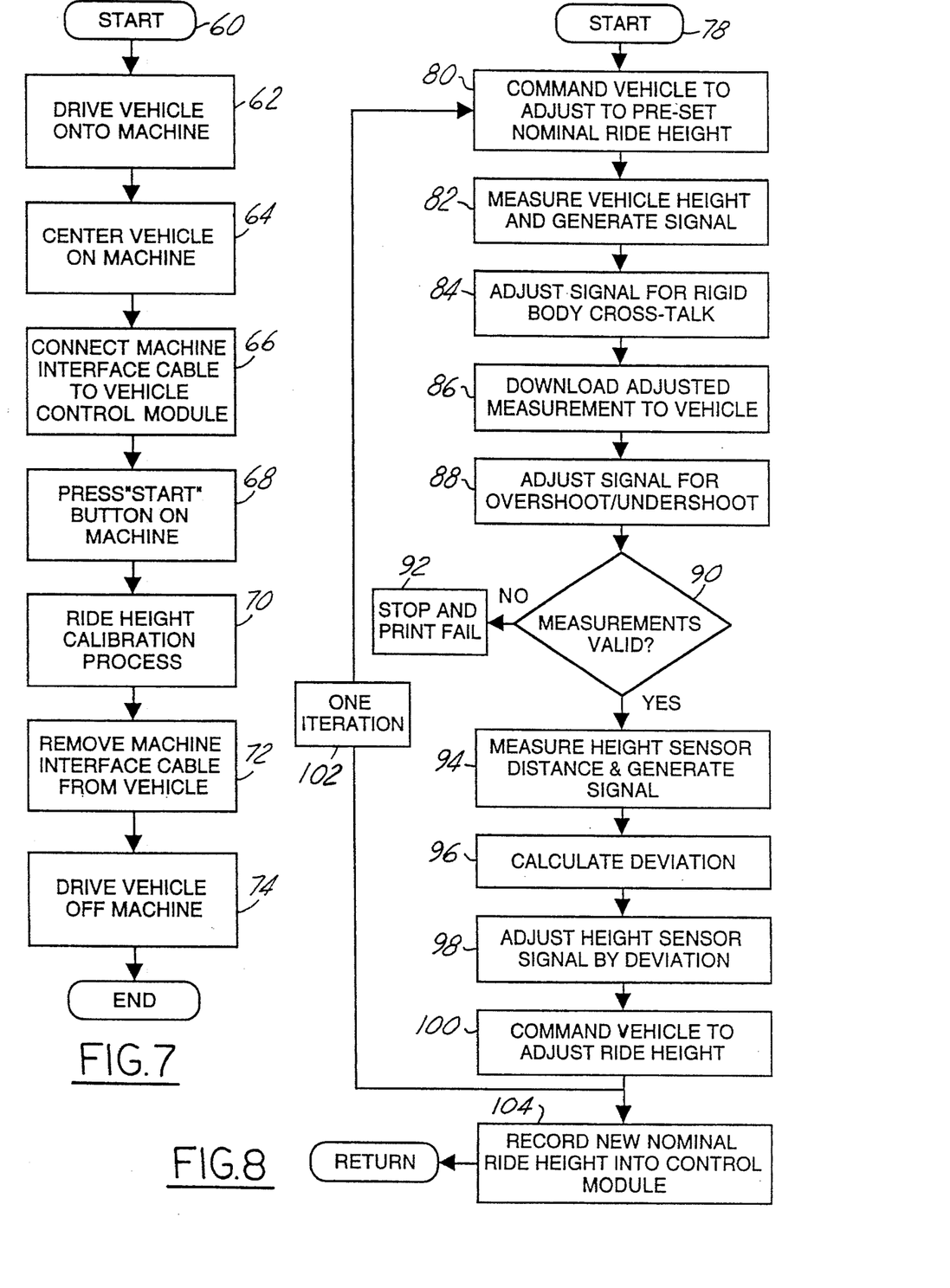
FIG. 7 is an overall system block diagram in accordance with an embodiment of the present invention.
FIG. 8 is a logical block diagram of a method of the present invention.

FIG. 7 shows an overall system block diagram of the present invention. Starting at block 60, vehicle 10 is driven onto apparatus 12, as depicted in block 62. In block 64, vehicle 10 is roughly centered by fixed centering rollers 18, such as those common in vehicle assembly plants, and then more accurately centered by pneumatic centering rollers 22 which press toward wheels 12, as described above. This step is very important, as accurate centering is required to assure that fixed position measurement devices 24 shine onto the points on control arm 38 that correspond to the points assumed by the measurement device control algorithm. Inaccurate centering of vehicle 10 may result in inaccurate ride heights and the problems concomitant therewith as described above.

In block 66, a communication cable from apparatus 12 is plugged into on-board computer module 36 on vehicle 10. This allows apparatus 12 to become a communicating node on the vehicle communication link. The driver then exits vehicle 10 the until process is complete. In block 68, an operator then presses a "start" button on apparatus 12 to begin the ride height calibration process. Communication is established between the vehicle and the laser ride height machine in this step using, for example, the Standard Corporate Protocol (SCP), or other protocols known to those skilled in the art. Apparatus 12 may also check vehicle 10 for calibration readiness, including whether the air suspension is enabled, the doors are closed, the engine is running, and communication with on-board computer module is established. The ride height calibration process, which is further explained below with reference to FIG. 8, is then accomplished in block 70. After the process is completed, the communication cable is removed from control module 36 (block 72) and vehicle 10 is driven off of apparatus 12 (block 74).

A flow chart of the ride height calibration process referred to in block 70 of FIG. 7 is shown in greater detail in FIG. 8. At the start in block 78, apparatus 12 commands vehicle to go to a pre-calibrated nominal ride height as measured by height sensors 40, as shown in block 80. This pre-calibrated value is dependent solely on the default calibration of on-board control module 36 and does not account for vehicle build variance. Control module 36 signals to apparatus 12 when the pre-calibrated nominal ride height has been achieved so that the calibration process can continue.

In block 82, apparatus 12 then takes a ride height measurement by shining suspension control arms 38 with measurement devices 24 to determine arm position. The difference between raw signals corresponding to two points on each arm is further adjusted in block 84 as described above for rigid body cross-talk, also called side-to-side lean, of vehicle 10 to determine actual ride height. This is a very important step because rigid body cross-talk will result in inaccurate ride height if no adjustment is made to correct for it. The adjusted ride height measurement is downloaded to control module 36 in block 86. Control module 36 has a value corresponding to the magnitude of suspension overshoot or undershoot resulting from suspension system inertial effects and inherent inaccuracy, which, for example, is approximately ±2 mm. In block 88, control module 36 further adjusts the ride height measurement for overshoot or undershoot.

Figure 9:
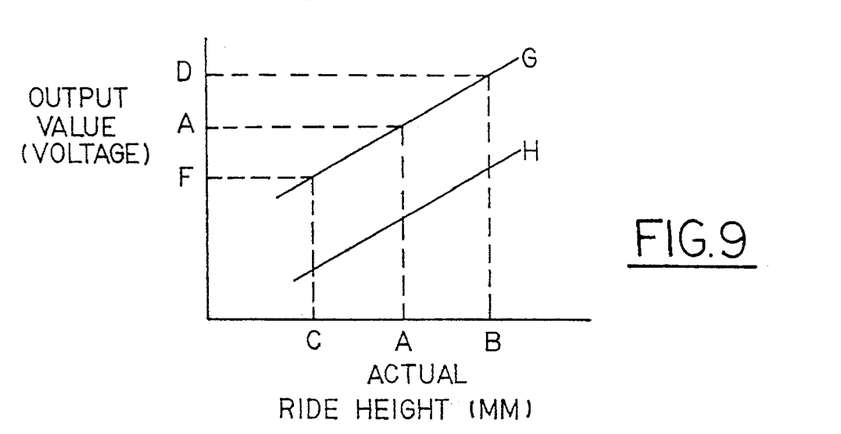
FIG. 9 is a graphic representation of a transfer function utilized in the present invention.

In decisional diamond 90, the measurements are evaluated by control module 36 for validity before implementing modifications. If the measurements are outside acceptable values, then the process is stopped and a fail message is printed in block 92. If the ride height measurements are valid, then the process continues in block 94 with measurement of the height sensor 40 distances between the sprung and unsprung vehicle mass and those signals are sent to control module 36. Control module 36 then converts the actual vehicle ride height position into a value equivalent to that received by the height sensor, such as voltage. When signals, the adjusted actual ride height measurements and the height sensor distances, are in equivalent units, which is done by control module 36 by means of a linear transfer function known to those skilled in the art, control module 36 calculates a deviation or a difference between the two values at block 96. FIG. 9 shows a graphic representation of the transfer function used by control module 36 of the present invention. An example utilizing this transfer function will be described after the method of the present invention is further described.

After calculating the deviation or the difference between the adjusted ride height signals and the height sensor output signals, control module 36, at block 98, adjusts the height sensor output signals by an amount equal to the deviation so that there is a correspondence or correlation between the height sensor output signal and the actual ride height of the vehicle. It can be assumed throughout the method of the present invention that the height sensors utilized in a vehicle employing the present invention, especially those of analog type sensors, may be incorrectly calibrated at their point of manufacture or that the amount of discrepancy between the mounting points on the height sensors at the various locations within the vehicle tend to be off due to the bending or skewing of the vehicle body. As such, the height sensor output signal may not necessarily correspond to the actual vehicle ride height.

After the output signals have been adjusted at height sensors 40, the control module 36 actuates suspension units 30 to put vehicle 10 to its adjusted ride height, or trim height, at block 100. It should be readily apparent to those skilled in the art that the present invention is not meant to be limited to any particular trim height or predetermined tolerance and that each vehicle may correspondingly have a different trim ride height. After the suspension units 30 are actuated, control module 36 does a reiterative check at block 102 to determine whether the height sensor output signal is correlated to the actual vehicle ride height. If it is, the deviation is permanently burned into a non-volatile memory of control module 36 at block 104. It should be readily apparent to those skilled in the art that other types of memories within control module 36 could be utilized in place of the non-volatile memory. The present invention is not meant to be limited solely to control module 36 having a nonvolatile memory.

All adjustment calculations, such as the deviation calculations and suspension overshoot/undershoot, are performed in control module 36, except the rigid body cross-talk adjustment, which is performed in processor 28. It is important that this functionality reside in vehicle 10 and not with apparatus 12 so that service repairs can be made on the vehicle control module 36 and height sensors 40 while allowing electronic calibration of ride heights with service equipment, precluding the need for mechanically adjusting the height sensors 40 and risking damage.

Referring now to FIG. 9, a plot of the transfer function used in calibrating a suspension control module according to the method of the present invention is designated by line G. Output value, such as voltage, is plotted on the y-axis or the ordinate, while actual ride height, in millimeters, is plotted on the abscissa, or x-axis. Assuming that point A on the x-axis relates to a predetermined ride height, such as trim, this trim ride height position has an equivalent output value or voltage, point A on the y-axis, as determined by the transfer function, line G: $G=(mX+b)$ wherein m is the slope of line G and b is an offset. It is necessary to convert the signal from the actual ride height measuring device 24 into the same units as the height sensor output signals so that the processor can compare the like signals to determine whether an adjustment to the control module is needed. The transfer function above allows the signal from the ride height measurement device to be converted into a signal having the same units of measurement as are output from the height sensors, such as voltage. Other types of signals may be used as well in the present invention, such as pulse width modulated signals, frequency modulated signals, digital, non-linear or current loop signals.

Although the preferred embodiment of the present invention has been disclosed, various changes and modifications may be made without departing from the scope of the invention as set forth in the appended claims.

We claim:

1. An apparatus for calibrating a suspension control module of a vehicle to within a preselected tolerance of a predetermined ride height, said vehicle having at least one adjustable suspension unit interposed between a sprung and unsprung vehicle mass, said apparatus comprising:

first means for measuring a first distance corresponding to an actual ride height of said vehicle and for generating a first signal representative thereof, said first distance referenced to a coordinate system within said vehicle;

second means for measuring a second distance between said vehicle sprung and unsprung mass and for generating a second signal representative thereof; and processor means operatively associated with said first and second measuring means for comparing said first and second signals and for calculating a deviation between said signals, said processor means operative to generate a third signal corresponding to said deviation and to store said deviation in said control module.

2. An apparatus according to claim 1 wherein said first means measures a vertical distance between two points on a control arm connecting the chassis to a wheel carrier of said vehicle and generates a first signal representative thereof.

3. An apparatus according to claim 2 wherein said first means comprises a pair of laser measuring tools operative to generate a pair of laser signals and receive reflections of said signals from two separate points on said control arm so as to calculate a distance therebetween.

4. An apparatus according to claim 2 and further having positioning means for positioning said vehicle with respect to said first means so that said control arm is in vertical alignment with said first means.

5. An apparatus according to claim 4 wherein said positioning means comprises a pair of parallel rows of fixed rollers spaced apart so as to receive the tires of said vehicle therebetween.

6. An apparatus according to claim 5 wherein each of said rows has a pair of pneumatically operable rollers adjacent with the tires of said vehicle when on said apparatus for properly positioning said vehicle with respect to said first means by pushing on said tires.

7. An apparatus according to claim 1 wherein said processor means is operative to adjust said second signal by said deviation to provide correlation between said second signal and said actual ride height.

8. An apparatus according to claim 1 wherein said processor means adjusts said first distance to compensate for measuring error due to vehicle rigid body cross-talk.

9. An apparatus according to claim 1 wherein said processor means has stored therein a predetermined value to adjust said deviation to compensate for system overshoot and undershoot.

10. An apparatus according to claim 1 wherein said first means comprises a pair of a sonic transducers operative to generate a pair of signals and receive reflections of said signals from two separate points on said control arm so as to calculate distance therefrom.

11. An apparatus according to claim 1 wherein said second means comprises a linear height sensor.

12. An apparatus according to claim 1 wherein said second means comprises a linear voltage displacement transducer.

13. A method for calibrating a suspension control module of a vehicle to within a preselected tolerance of a predetermined ride height, said vehicle having a suspension system including plurality of adjustable suspension units interposed between a sprung and unsprung vehicle mass, said method comprising the steps of:

(a) measuring a first distance corresponding to an actual vehicle ride height within a coordinate system referenced to said vehicle and generating a first signal corresponding thereto, said signal having a first value corresponding to said distance;

(b) measuring a second distance between said vehicle sprung and unsprung mass and generating a second signal corresponding thereto, said second signal having a second value corresponding to said distance;

(c) calculating a deviation between said first value and said second value;

(d) adjusting said second signal by said deviation; and (e) storing said deviation into a memory of said control module for adjustment of said at least one adjustable suspension unit to correspond with said actual ride height.

14. A method for calibrating a suspension control module according to claim 13, further including the step of:

(f) adjusting said first signal to compensate for measuring error due to vehicle rigid body cross-talk before calculating said deviation in step (c).

15. A method for calibrating a suspension control module according to claim 13, further including the step of:

(f) adjusting said deviation to compensate for vehicle suspension system overshoot and undershoot before adjusting said second signal by said deviation in step (d) and before storing said deviation into a memory of said control module in step (e).

16. An apparatus for calibrating a suspension control module of a vehicle to within a preselected tolerance of a predetermined ride height, said vehicle having at least one adjustable suspension unit interposed between a sprung and unsprung vehicle mass, said apparatus comprising:

a pair of measuring tools for measuring a first distance corresponding to an actual ride height of said vehicle and for generating a first signal representative thereof, said first distance referenced to a coordinate system within said vehicle;

second means for measuring a second distance between said vehicle sprung and unsprung mass and for generating a second signal representative thereof; and processor means operatively associated with said first and second measuring means for comparing said first and second signals and for calculating a deviation between said signals, said processor means operative to generate a third signal corresponding to said deviation and to store said third signal in said control module for adjustment of said at least one adjustable suspension unit to correspond with said actual ride height.

17. An apparatus according to claim 16 wherein said pair of measuring tools measures a vertical distance between two points on a control arm connecting the chassis to a wheel carrier of said vehicle and generates a first signal representative thereof.

18. An apparatus according to claim 17 wherein said pair of measuring tools comprises a pair of lasers operative to generate a pair of laser signals and receive reflections of said signals from two separate points on said control arm so as to calculate a distance therebetween.

* * * * *